United States Patent
Chestnut (10) Patent No.: US 6,404,874 B1
(45) Date of Patent: Jun. 11, 2002

(54) TELECOMMUTE SERVER

(75) Inventor: Kevin L. Chestnut, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/686,274

(22) Filed: Oct. 10, 2000

Related U.S. Application Data (63) Continuation of application No. 09/481,741, filed on Jan. 11, 2000, now abandoned, which is a continuation of application No. 08/825,206, filed on Mar. 27, 1997, now Pat. No. 6,041,114.

(51) Int. Cl.[7] ............................................. H04M 3/42
(52) U.S. Cl. ............................ 379/211.02; 379/93.02
(58) Field of Search .......................... 379/210, 211, 379/219, 220, 93.02, 93.03

(56) References Cited

U.S. PATENT DOCUMENTS

| | | | |
|---|---|---|---|
| 4,086,434 A | 4/1978 | Bocchi ............................ 179/2 |
| 4,221,933 A | 9/1980 | Cornell et al. .................. 179/6 |
| 4,277,649 A | 7/1981 | Sheinbein ..................... 179/18 |
| 4,289,931 A | 9/1981 | Baker .......................... 179/5.5 |
| 4,395,590 A | 7/1983 | Pierce et al. .................... 179/2 |
| 4,534,041 A | 8/1985 | Munter ......................... 375/94 |
| 4,544,804 A | 10/1985 | Herr et al. ..................... 179/18 |
| 4,602,129 A | 7/1986 | Matthews ..................... 179/18 |
| 4,625,081 A | 11/1986 | Lotito .......................... 379/88 |
| 4,661,975 A | 4/1987 | Brecher ....................... 379/215 |
| 4,696,028 A | 9/1987 | Morganstein ................ 379/88 |
| 4,696,031 A | 9/1987 | Freudberg et al. .......... 379/386 |
| 4,697,282 A | 9/1987 | Winter et al. ................. 379/67 |
| 4,723,211 A | 2/1988 | Barker et al. ............... 364/300 |
| 4,723,273 A | 2/1988 | Diesel et al. ................ 379/211 |
| 4,736,405 A | 4/1988 | Akiyama ....................... 379/89 |
| 4,737,984 A | 4/1988 | Brown ........................ 379/372 |
| 4,747,124 A | 5/1988 | Ladd ............................ 379/67 |
| 4,748,664 A | 5/1988 | Blomley ..................... 379/395 |
| 4,782,518 A | 11/1988 | Mattley ...................... 379/201 |
| 4,783,796 A | 11/1988 | Ladd ............................ 379/67 |
| 4,785,408 A | 11/1988 | Britton et al. ........... 364/513.5 |
| 4,797,910 A | 1/1989 | Daudelin ...................... 379/67 |
| 4,809,272 A | 2/1989 | Torgrim et al. ........... 370/110.3 |
| 4,809,321 A | 2/1989 | Morganstein et al. ....... 379/211 |
| 4,811,381 A | 3/1989 | Woo et al. .................... 379/67 |
| 4,815,120 A | 3/1989 | Kosich ......................... 379/34 |
| 4,821,314 A | 4/1989 | Guyader et al. ............ 379/376 |
| 4,852,151 A | 7/1989 | Dittakavi et al. ............. 379/97 |
| 4,853,952 A | 8/1989 | Jachmann et al. ............ 379/88 |
| 4,866,755 A | 9/1989 | Hashimoto ................... 379/80 |
| 4,878,236 A | 10/1989 | Ray et al. ..................... 379/37 |

(List continued on next page.)

FOREIGN PATENT DOCUMENTS

| | | | |
|---|---|---|---|
| EP | 197648 | 10/1986 | |
| EP | 382670 | 8/1990 | |
| FR | 2577093 | 8/1986 | ................. 379/76 |
| JP | 61-39756 | 2/1986 | ................. 379/76 |
| JP | 63-74365 | 4/1988 | ................. 379/88 |
| JP | 63-139454 | 6/1988 | ................. 379/89 |
| JP | 1-248752 | 10/1989 | ................. 379/89 |
| WO | WO 96/32803 | 10/1996 | ........... H04M/3/50 |

*Primary Examiner*—Creighton Smith
(74) *Attorney, Agent, or Firm*—Hickman Palermo Truong & Becker LLP (57) ABSTRACT

A method and device for managing a telecommunication system, including call forwarding, with a computer network (LAN, WAN, etc.) integrated with a private branch exchange (PBX) connected to a Public Switched Telephone Network (PSTN). Calls are forwarded based upon the device used to log onto the computer network by the called party.

9 Claims, 5 Drawing Sheets

U.S. PATENT DOCUMENTS

| | | | | |
|---|---|---|---|---|
| 4,893,332 | A | 1/1990 | Brown | 379/97 |
| 4,894,864 | A | 1/1990 | Fujioka | 379/374 |
| 4,897,866 | A | 1/1990 | Majmudar et al. | 379/94 |
| 4,899,358 | A | 2/1990 | Blakley | 379/67 |
| 4,926,462 | A | 5/1990 | Ladd et al. | 379/67 |
| 4,932,021 | A | 6/1990 | Moody | 370/54 |
| 4,935,156 | A | 6/1990 | Van Konynenburg et al. | 219/553 |
| 4,935,958 | A | 6/1990 | Morganstein et al. | 379/372 |
| 4,942,598 | A | 7/1990 | Davis | 379/57 |
| 4,953,159 | A | 8/1990 | Hayden et al. | 370/62 |
| 4,969,136 | A | 11/1990 | Chamberlin et al. | 369/29 |
| 4,972,462 | A | 11/1990 | Shibata | 379/89 |
| 4,975,941 | A | 12/1990 | Morganstein et al. | 379/88 |
| 4,985,913 | A | 1/1991 | Shalom et al. | 379/76 |
| 4,995,076 | A | 2/1991 | Joffe et al. | 379/257 |
| 5,007,000 | A | 4/1991 | Baldi | 379/513.5 |
| 5,007,076 | A | 4/1991 | Blakley | 379/67 |
| 5,008,926 | A | 4/1991 | Misholi | 379/89 |
| 5,008,927 | A | 4/1991 | Weiss et al. | 379/98 |
| 5,008,930 | A | 4/1991 | Gawrys et al. | 379/210 |
| 5,023,868 | A | 6/1991 | Davidson et al. | 370/62 |
| 5,027,384 | A | 6/1991 | Morganstein | 379/67 |
| 5,029,196 | A | 7/1991 | Morganstein | 379/67 |
| 5,029,198 | A | 7/1991 | Walpole et al. | 379/88 |
| 5,031,205 | A | 7/1991 | Phillips | 379/88 |
| 5,034,975 | A | 7/1991 | Grimes | 379/67 |
| 5,054,054 | A | 10/1991 | Pessia et al. | 379/89 |
| 5,058,152 | A | 10/1991 | Solomon et al. | 379/67 |
| 5,063,593 | A | 11/1991 | Kwon | 379/386 |
| 5,085,152 | A | 2/1992 | Tylisz et al. | 105/419 |
| 5,097,528 | A | 3/1992 | Gurahaney et al. | 379/67 |
| 5,127,003 | A | 6/1992 | Doll, Jr. et al. | 370/110.1 |
| 5,168,515 | A | 12/1992 | Gechter et al. | 379/265 |
| 5,172,404 | A | 12/1992 | Hashimoto | 379/67 |
| 5,228,073 | A | 7/1993 | Smith | 379/57 |
| 5,243,642 | A | 9/1993 | Wises, Jr. et al. | 379/82 |
| 5,278,894 | A | 1/1994 | Shaw | 379/67 |
| 5,283,818 | A | 2/1994 | Klausner et al. | 379/67 |
| 5,309,505 | A | 5/1994 | Szlam et al. | 379/88 |
| 5,309,512 | A | 5/1994 | Blackmon et al. | 379/210 |
| 5,309,513 | A | 5/1994 | Rose | 379/265 |
| 5,317,630 | A | 5/1994 | Feinberg et al. | 379/94 |
| 5,327,486 | A | 7/1994 | Wolff et al. | 379/96 |
| 5,327,493 | A | 7/1994 | Richmond et al. | 379/372 |
| 5,329,578 | A | 7/1994 | Brennan et al. | 379/67 |
| 5,333,266 | A | 7/1994 | Boaz et al. | 395/200 |
| 5,339,352 | A | 8/1994 | Armstrong et al. | 379/58 |
| 5,347,574 | A | 9/1994 | Morganstein | 379/210 |
| 5,351,276 | A | 9/1994 | Doll, Jr. et al. | 379/67 |
| 5,361,295 | A | 11/1994 | Solomon et al. | 379/67 |
| 5,363,431 | A | 11/1994 | Schull et al. | 379/67 |
| 5,396,542 | A | 3/1995 | Alger et al. | 379/67 |
| 5,400,335 | A | 3/1995 | Yamada | 370/94.1 |
| 5,402,499 | A | 3/1995 | Robinson et al. | 381/119 |
| 5,434,906 | A * | 7/1995 | Robinson et al. | 379/88.73 |
| 5,459,581 | A | 10/1995 | Ohyanagi | 358/296 |
| 5,463,676 | A | 10/1995 | Ohsawa | 379/67 |
| 5,471,519 | A | 11/1995 | Howe et al. | 379/67 |
| 5,488,650 | A | 1/1996 | Greco et al. | 379/67 |
| 5,509,049 | A | 4/1996 | Peterson | 379/58 |
| 5,533,102 | A | 7/1996 | Robinson et al. | 379/67 |
| 5,533,110 | A | 7/1996 | Pinard et al. | 379/201 |
| 5,568,540 | A | 10/1996 | Greco et al. | 379/89 |
| 5,581,604 | A | 12/1996 | Robinson et al. | 379/67 |
| 5,583,920 | A | 12/1996 | Wheeler, Jr. | 379/88 |
| 5,625,676 | A | 4/1997 | Greco et al. | 379/88 |
| 5,631,954 | A | 5/1997 | Evans et al. | 379/201 |
| 5,633,916 | A | 5/1997 | Goldhagen et al. | 379/67 |
| 5,642,410 | A | 6/1997 | Walsh et al. | 379/201 |
| 5,651,054 | A | 7/1997 | Dunn et al. | 379/67 |
| 5,729,598 | A | 3/1998 | Kay | 379/115 |
| 5,754,636 | A | 5/1998 | Bayless et al. | 379/142 |
| 5,764,639 | A * | 6/1998 | Staples et al. | 379/93.02 X |
| 5,926,754 | A | 7/1999 | Cirelli et al. | 455/414 |
| 5,940,488 | A | 8/1999 | DeGrazia et al. | 379/201 |
| 6,041,114 | A | 3/2000 | Chestnut | 379/211 |

* cited by examiner

TELECOMMUTE SERVER

This application is a continuation of 09/481,741 filed Jan. 11, 2000 now abandoned. Which is a continuation of U.S. Pat. No. 08/825,206, filed Mar. 27, 1997 now U.S. Pat. No. 6,041,114.

FIELD OF THE INVENTION

The present invention relates generally to a system for managing a telecommunications system, and more particularly to a telecommunications management system which controls call forwarding based upon user activity on an associated computer terminal.

BACKGROUND OF THE INVENTION

Telecommuting is the substitution of telecommunications technology for the trip to and from the primary workplace. Computers, cellular phones, voice messaging, fax machines, and advanced communications links such as Integrated Services Digital Network (ISDN) and dial-up access have removed the barriers that once required workers to be in their offices. Telecommuting applies to employees working at home, employees working from a satellite office, and employees working "on the road".

The potential advantages of telecommuting are numerous and varied. Beyond the obvious advantages such as reduced rush hour traffic and enhanced air quality, there are a number of less obvious advantages such as increased employee productivity and expanded geographic range. Additionally, total office space requirements can be reduced when employees work at home, satellite offices can be established with lower overhead and are possible in areas that would have been geographically prohibitive, and emergency preparedness is improved through the decentralization of resources.

The Local-Area Network (LAN) is fast becoming the technology backbone of today's offices, since more and more computing and information resources are based on the LAN. Office workers who come to rely on easy LAN access need the same kind of access when they are working away from the office.

While electronic mail grows in popularity, the telephone and accompanying voice messaging systems are still a necessary part of the modern business environment. Computer and telephone systems are being linked through Computer Telephony Integration (CTI) applications which facilitate incoming and outgoing call handling and control.

CTI applications can be used to seamlessly interface the caller, the called party, and information on a host computer for a variety of applications. CTI applications deliver caller ID, automatic number identification (ANI), dialed number identification services (DNIS), and interactive voice response (IVR) dialed digits, such as a customer's account number, to a software application. CTI applications can also deliver request signals, such as "hold call" or "transfer call", to a telephone system.

Numerous prior art systems allow employees to access a Local Area Network via a remote dialup. Once connected they can access most of the resources of the LAN as if they were in the office. However, since the telephone they are using is not part of the office phone system they are cut off from the bulk of the CTI application functions they have available to them at the office. Some systems may allow them to listen to voice mail, however they are no longer able to use any applications which require them to have access to a telephone connected to the office telephone system. Other prior art systems allow employees to remotely access voice messaging and set call forwarding through the use of Dual Tone Multi Frequency (DTMF) tones from a touch tone phone.

In most prior art systems, the lack of integration between a company's telephone system and LAN means that an employee has to call in to the company's phone system to check their voice messaging, manually set call forwarding, and then remotely log on to the company's LAN. After call forwarding is set up, people calling the employee will have lost the ability to leave voice messaging or the employee will have to continue to call in to check their voice messaging. After logging off the LAN, the employee must remember to call into the company's telephone system to discontinue call forwarding. Furthermore, there are numerous telephone systems which do not even afford this level of connectivity, which in turn makes telecommuting a less viable alternative.

In order for a company and its employees to obtain the fullest benefit from telecommuting, communications between telecommuting employees, the primary office, and the outside world must be managed efficiently. The management of telecommunications resources extends to telephone and data communications alike. There is a need for a telecommunications management system which closely integrates a company's LAN with its telephone network and makes the same CTI application functions available to an employee whether they are in the office or working from a remote location.

The present invention closely integrates a company's LAN with its telephone network and controls call forwarding based upon user activity on an associated computer terminal. The present invention extends the functionality of the office telephone system to whatever phone the employee has available at a remote location.

SUMMARY OF THE INVENTION

The present invention, referred to as a telecommute server, is a method for controlling call forwarding using a computer connected to a data network and a telephone network. The call is forwarded based upon whether or not the called party is logged onto the data network. The forwarded call is directed to a telephone line associated with the terminal from which the called party is logged on. The called party may be associated with a particular extension and calls directed to that extension will ring through to the phone associated with the computer the called party is currently logged onto.

Call forwarding is terminated when the called party logs off or the connection is broken. The called party may instruct the system to continue call forwarding for a specified amount of time after a disconnection or they log off. Call forwarding may also be scheduled for a predefined period of time after an initial logon regardless of whether the computer is logged on or off.

Call forwarding based on computer logon may be further scheduled so that calls are forwarded to different telephone lines associated with telephones or voice messaging systems depending upon a predefined schedule. Alternatively, call forwarding may be made conditional based upon other information received by the telephone system, such as caller ID or ANI. The system can also be set up to alter the schedule if it detects that the called party is logged onto a terminal associated with a different telephone extension than the one defined in the schedule.

Logging on to the data network may cause more than one phone line to be forwarded. By way of example, logging on from a computer at home may cause voice phone calls to be forwarded to one telephone line associated with the called party's home and fax calls directed to a particular fax machine to be forwarded to another location. Also, the type of connection used to log on may serve to identify which extension the calls should be forwarded to.

Calls may originate from outside or from within the company and may be forwarded within the company or to an outside line. This is an important feature of the invention because it makes employees just as accessible as they would be if they were at their desk in the employer's office.

Another aspect of the present invention provides a method for controlling call forwarding by providing the caller with the option of trying the called party at a second location if they are not available at a first location.

In one embodiment, the caller may be provided with a list of locations, any of which can be selected by the caller and tried in order to locate the called party. The list may be modified by the day of the week, the time of day, or whether or not the called party is currently logged on from a remote location. The list may also offer the caller the option to have the call forwarded to a third party.

Additionally, the system may also provide different callers with different levels of access to call forwarding options. Callers may be identified through "caller ID", inputting an identifying code via the telephone touchpad, or some other method of identification. Unknown or low priority callers may only be given the option of leaving a message or having the call transferred to another party while a higher priority caller may be given the option of trying to reach the called party at home.

The system may also be set up to record a message from the caller to be played to a remote called party as part of determining how best to forward the call. The call forwarding options may be automatic or may be presented to the caller or the called party in the form of a menu. The menu may be presented audibly over the phone line or it may be presented in list form on a display. The display may either be part of a communications device or a separate computer display.

The system of the present invention may also be used in conjunction with a Network Switch Server (NSS) which would give the caller the ability to respond to a call forwarding option menu from a computer terminal via a data network.

The present invention also includes a call progress manager which controls the protocols used to forward a call depending upon where the call originated and where it was forwarded to. Progress tones such as busy, trunk busy (reorder), ring no answer, answered by human, answered by machine, are managed. The present invention generates the necessary control signals to respond to the progress tones generated by the outside telephone network.

The system of the present invention can distinguish between internal extensions, outside lines, cell phones, Internet voice, and 2 way pagers. For example, on internal calls when there is "no answer", the system can be instructed to intercept for remote presence determination and ring at remote location while calls from outside the company are sent to a voice messaging system. Remote presence determination includes checking to see if the party being called is logged onto the data network or if they have scheduled to have calls forwarded at this time.

The present invention, a telecommute server, can either be integrated into a system which includes voice messaging or may be used as a stand-alone system which can be connected to a separate voice messaging system. The telecommute server intercepts incoming calls which would be forwarded to voice mail because of a "ring no answer" progress tone, records the DTMF tones which would be provided to the voice messaging system, and checks to see if there is an alternative line to which the call should be forwarded. If there is no alternative line to which the call should be forwarded, the system telecommute server passes the call onto the voice messaging system. If there is a line to which the call should be forwarded, the telecommute server forwards the call to the specified line. If there is no answer at the forwarded number, the Telecommute Server transfers the call back to the voice messaging system and plays the earlier recorded DTMF tones to the voice messaging system. The voice messaging system then answers the call as it would have without the presence of the telecommute server. The telecommute server can, through recording the DTMF tones, control any DTMF controlled device. The system can be implemented so as to work with any prior art device whether it uses in-band or out-band signaling.

These and other features of the present invention will be more fully appreciated when considered in light of the following detailed description and drawings.

DETAILED DESCRIPTION OF THE INVENTION

Figure 1:
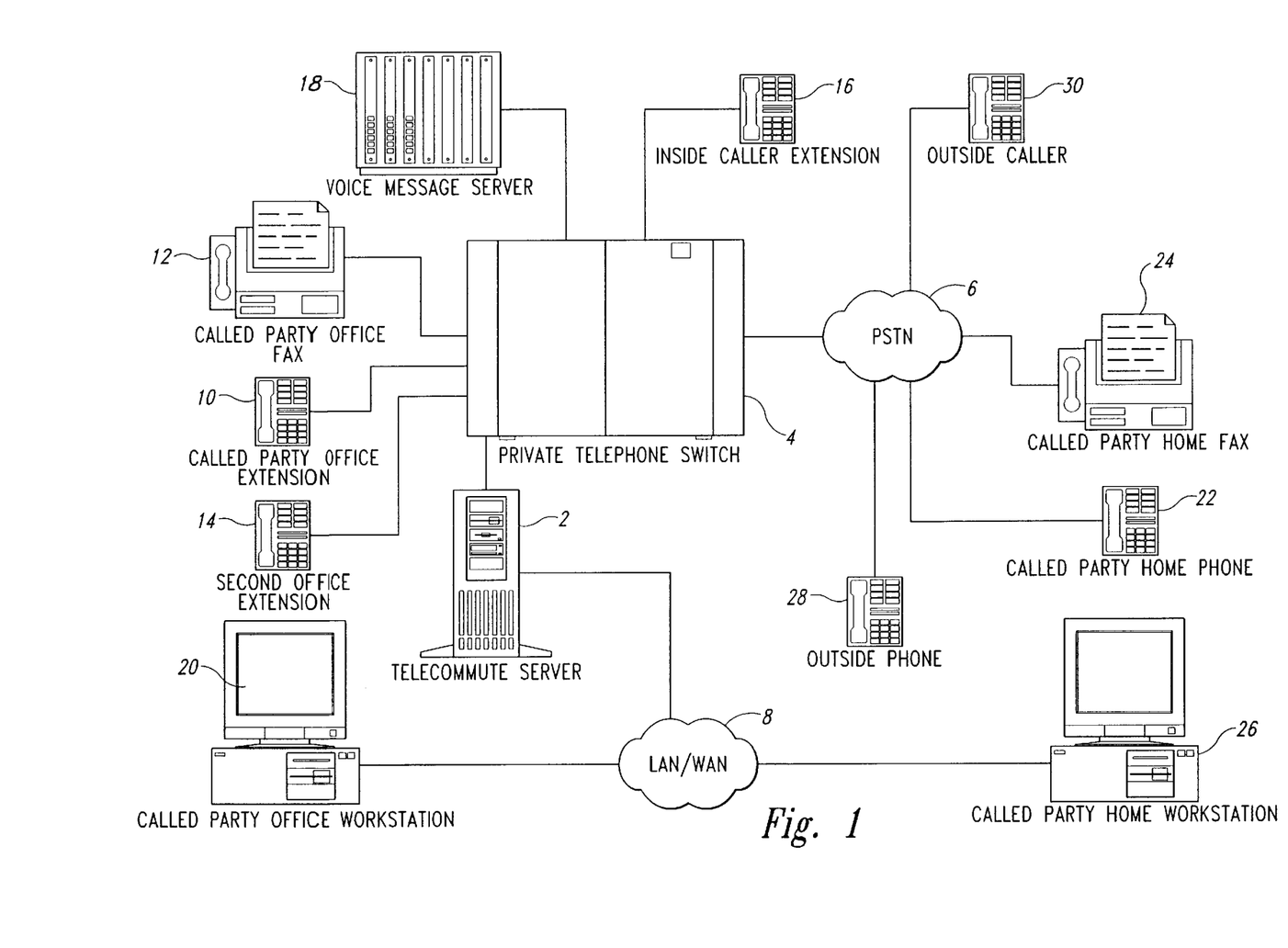
FIG. 1 is a functional diagram of the present invention.

FIG. 1 shows the telecommute server 2 connected to a computer network 8 and a private telephone switch (private branch exchange (PBX)) 4 which in turn is connected to a Publicly Switched Telephone Network (PSTN) 6. A called party office extension 10, a called party office fax machine 12, a second office extension 14, an inside caller extension 16, and a voice messaging system 18 are also connected to the PBX 4. A called party office work station 20 is connected to the computer network 8. Called party home phone 22, called party home fax 24, outside phone 28, and outside caller 30 are all connected to PSTN 6. A called party home workstation 26 is connected to the computer network 8.

When an outside caller 30 places a call on the PSTN 6 the call is directed to the called party office extension 10 by the private branch exchange 4. Before the PBX sends the call to the called party office extension 10, the telecommute server 2 checks the computer network 8 to see if the called party is logged on. If the called party is logged on, the telecommute server 2 instructs the private branch exchange 4 to forward the call to the telephone extension associated with the device the called party has used to log onto the computer network 8.

If the called party was logged onto the computer network 8 from the called party office workstation 20, then the call would be directed to the called party office extension 10. If the called party were logged onto the computer network 8 from the called party home workstation 26, then the telecommute server 2 would instruct the PBX 4 to forward the call to called party home phone 22. The telecommute server 2 selects the telephone number to which incoming calls should be forwarded based upon a record stored in a memory which associates a forwarding telephone number, such as the number for called party home phone 22, with a network logon device, such as called party home workstation 26.

If the connection between the network logon device, called party home workstation 26 or called party office workstation 20, and the computer network 8 is interrupted, intentionally (via a logoff) or accidentally (via a disconnect), the telecommute server 2 can continue to forward calls for a specified period of time after a disconnect or logoff. Alternatively, the telecommute server 2 can continue to forward calls to a previously associated telephone number for a specified period of time after a disconnect but forward calls to another telephone number or a voice message system after the called party logs off. The telecommute server 2 may either have the call forwarding preferences preprogrammed into it or the forwarding preferences may be entered by the called party when he/she logs onto or off of the computer network 8.

The telecommute server 2, can also forward incoming calls based upon other criteria including day or date, time of day, the identity of the caller, or any preprogrammed set of rules. It is within the scope of the invention for the telecommute server 2 to utilize a set of forwarding preferences which are based the above criteria as well as other factors such as who else in the office logged onto the computer network 8 or the telephone extensions currently in use.

If the called party is not currently logged onto the computer network 8, the telecommute server 2 will instruct the PBX 4 to direct the call to a default telephone number. In most instances, the called party office extension 10 will be the default telephone number. If the called party office extension 10 is not answered (generating a "ring no answer" signal), the PBX 4 may forward the call to a voice messaging system 18. Alternatively, the telecommute server 2 may instruct the PBX 4 to send the incoming call to a voice messaging system 18 if the called party is not logged onto the computer network 8.

In another embodiment of the present invention, the telecommute server 2 will be used with a voice messaging system 18 that requires information, in the form of control signals, from the PSTN 6 or PBX 4. When the telecommute server intercepts an incoming call to check if the called party is logged onto the computer network 8, it also records any control signals that would normally be provided to the voice messaging system from the PBX 4 or PSTN 6. If the telecommute server identifies that the called party is logged on, then it will forward the call to the appropriate telephone number. If the call is forwarded to a telephone number and there is no answer, then the telecommute server 2 plays the appropriate control signals to the voice messaging system 18.

The telecommute server 2 can also be set up to present a caller with a menu listing locations to which the call can be forwarded. The caller then selects a location, most likely using the telephone touchpad, and the telecommute server forwards the call to the selected location. If there is no answer, the telecommute server 2 can either transfer the call to a voice messaging system 18 or try another location. The menu presented to the caller may be modified based upon whether or not the called party is logged onto the computer network 8, time of day, day or date, or the caller's identity.

In another embodiment, the telecommute server 2 can ask the caller to record a message for the called party. The message is then forwarded to and played for the called party. The called party is then presented with a menu which allows him to take the call, record a message to be played for the calling party, transfer the call to a voice messaging system, or transfer the call to another telephone number. The options available to the called party may be modified based upon whether or not the called party is logged onto the computer network 8, time of day, day or date, or the caller's identity.

FIGS. 2–5 illustrate the methods embodied by the present invention. Reference numerals below refers to described steps in the method, not to any noun that they happen to follow.

Figure 2:
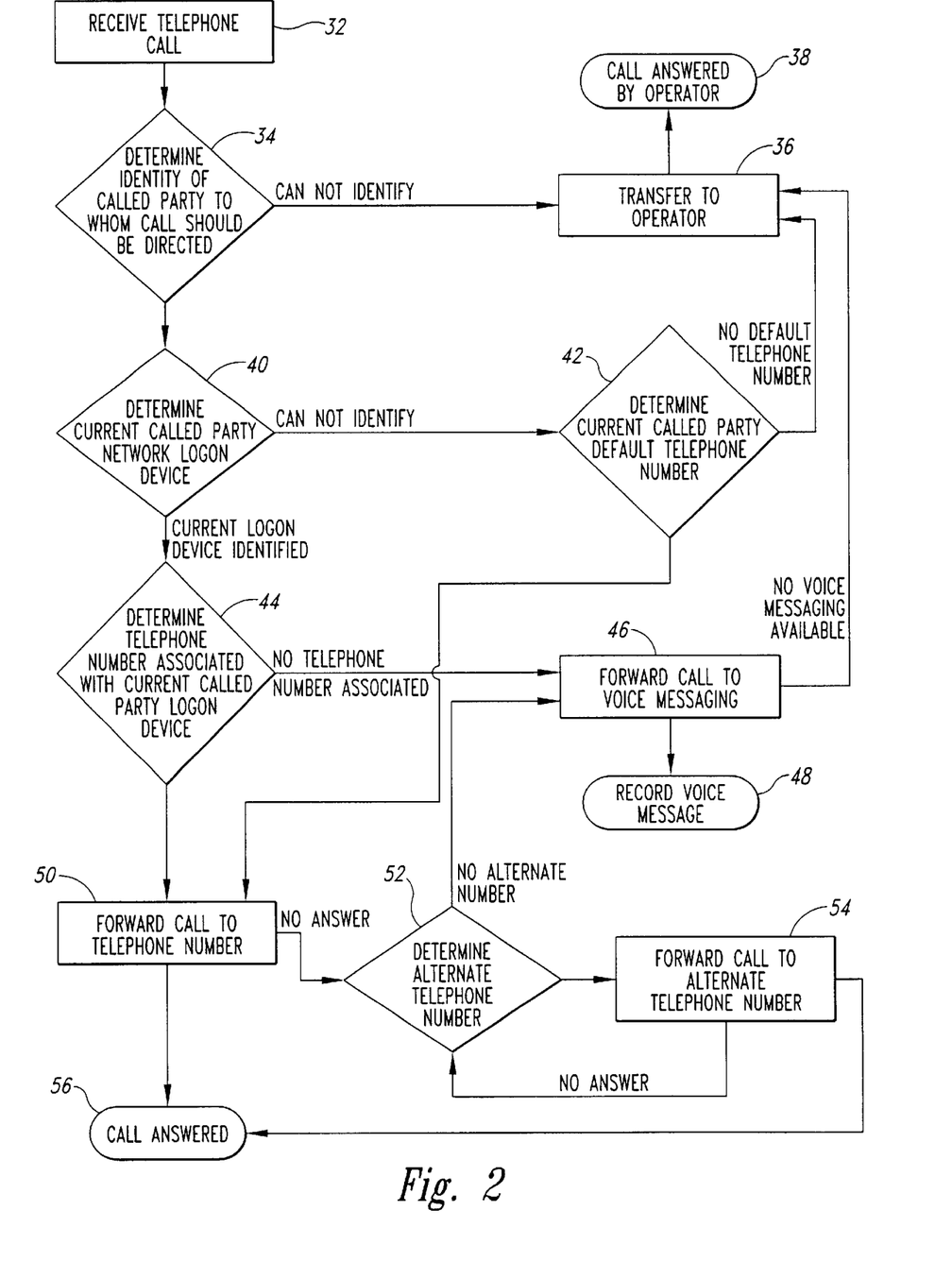
FIG. 2 is a flowchart of the method of the present invention.

In FIG. 2 a telephone call is received 32 and the identity of the called party is determined 34. If the called party can not be identified, the call is transferred to an operator 36 and the call is answered by an operator 38.

The identity of the called party is determined 34 by looking up the dialed extension in an index stored in a computer memory and storing the identity of the associated called party stored in a memory. If the identity of the called party is determined, then the next step is to determine the current called party network logon device 40. The current called party network logon device is determined 40 by comparing identity of the called party, which is stored in a memory, with a list of persons currently logged onto the computer network and the network identifier for the device with which they logged on to the computer network.

If no current logon device is identified, then the current called party default telephone number is determined 42 by comparing the identity of the called party, stored in a memory, with a list of default telephone numbers indexed by called party. If no default telephone number is available then the call is transferred to the operator 36 and the call is answered by an operator 38. If a default telephone number is determined 42 then the call is forwarded to the telephone number 50 and the call is answered 56.

If the current called party network logon device is determined then the telephone number associated with the current called party network logon device is determined 44 by comparing the identity of the logon device with a list of telephone numbers indexed by logon device stored in a memory. Other factors including time of day, day of the week, date, and/or the identity of the calling party may be used to determine the forwarding number by providing additional indexing criteria. The call is then forwarded to the identified telephone number 50. If no telephone number is associated with the current logon device, then the call is forwarded to a voice messaging system 46 and a message is recorded 48.

If the forwarded call is not answered, then an alternate forwarding number is determined 52 and the call is forwarded to the alternate telephone number 54. The alternate forwarding number is determined 52 in the same fashion as the telephone number associated with the current called party network logon device is determined 44 and additional factors may apply to the determination of the telephone number to which the call should be forwarded. If there is no answer, then a second alternative forwarding number will be identified 52 and the call is forwarded 54 to the second alternative forwarding number. If there is no alternative forwarding number available, the call is forwarded to a voice messaging system 46 and a message is recorded 48.

Figure 3:
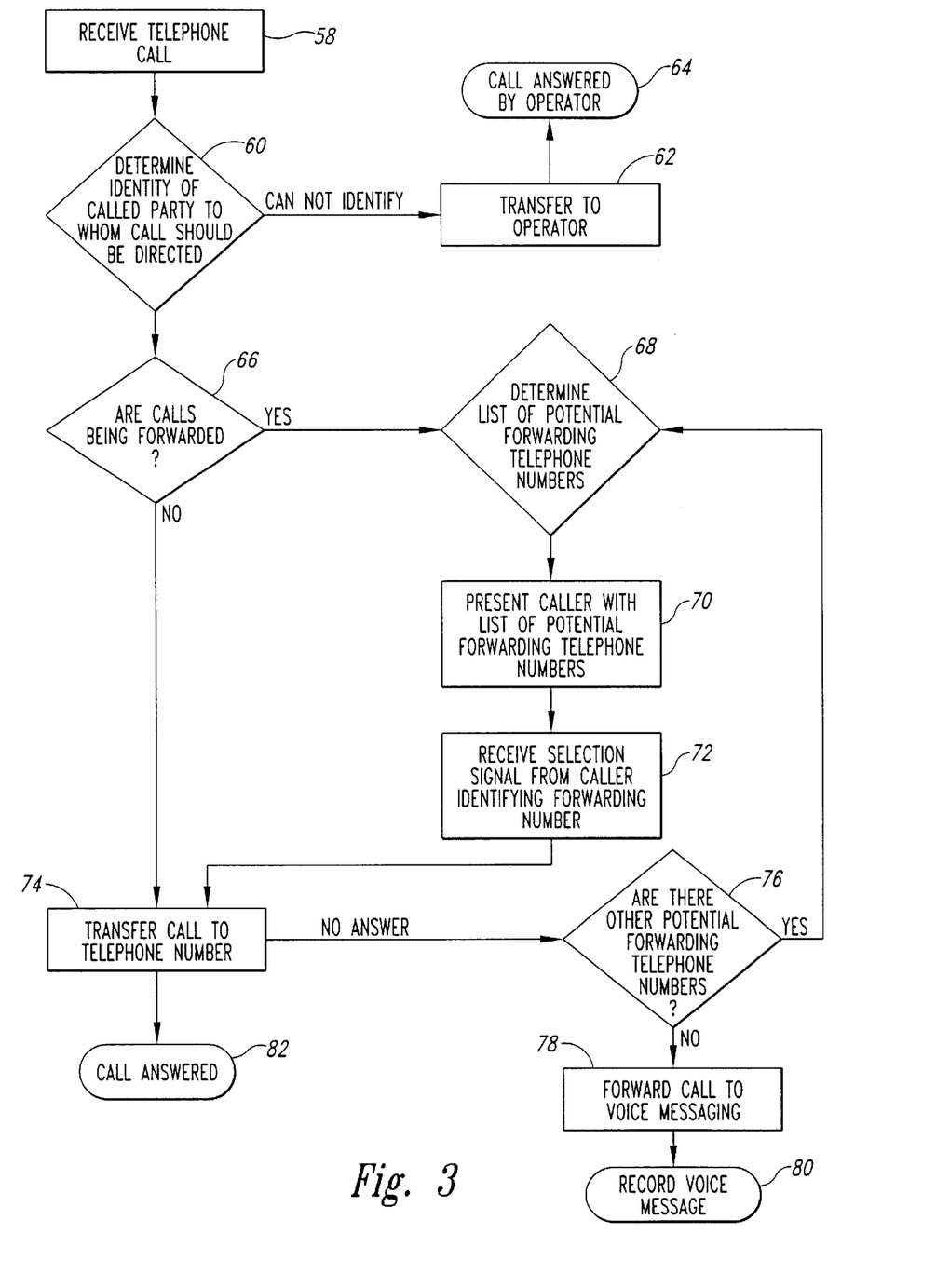
FIG. 3 is a flowchart of the method of the present invention.

In FIG. 3 a telephone call is received 58 and the identity of the called party is determined 60. If the called party can not be identified, the call is transferred to an operator 62 and the call is answered by an operator 64.

If the called party is identified, then the system checks to see if calls are being forwarded 66. If calls are being forwarded, then a list of potential forwarding numbers will be determined 68. The list of potential forwarding numbers can be based on one or more preprogrammed criteria, including the identity of the called party's current or most recent network logon device, day of the week, date, time of day, and/or the identity of the caller. The caller is then presented with a list of potential forwarding telephone numbers 70. These numbers may be presented as locations ("home phone, car phone, cell phone") or the caller may be offered options to "try another location or leave a message". As discussed above, different lists may be presented to different callers based on their identity or the source of origin of their call, and the lists of potential forwarding numbers may be effected by the time of day or other criteria. The caller then selects the telephone number (location) they want the call forwarded to. This selection may be made by pressing a key on the telephone keypad or speaking the selection into the receiver or, if the caller is connected via computer-telephone integration, by selecting a screen item with a mouse or pressing a key. The selection signal is received 72 and the call is transferred to the telephone number associated with the selection signal 74.

If calls are not being forwarded 66, then the call is transferred 74 to the originally dialed telephone number or the extension to which a PBX had transferred the call.

If there is no answer at the originally dialed telephone number, then the call will be forwarded to voice messaging 78 and a message will be recorded 80. If there is no answer at a forwarded telephone number, then other potential forwarding numbers will be identified 76. If there are other potential forwarding numbers, then a second list of potential forwarding numbers will be determined 68 and presented to the caller 70 and the forwarding process will be repeated. If there are no other potential forwarding telephone numbers or calls are not being forwarded, then the call will be forwarded to a voice messaging system 78 and a message recorded 80.

Figure 4:
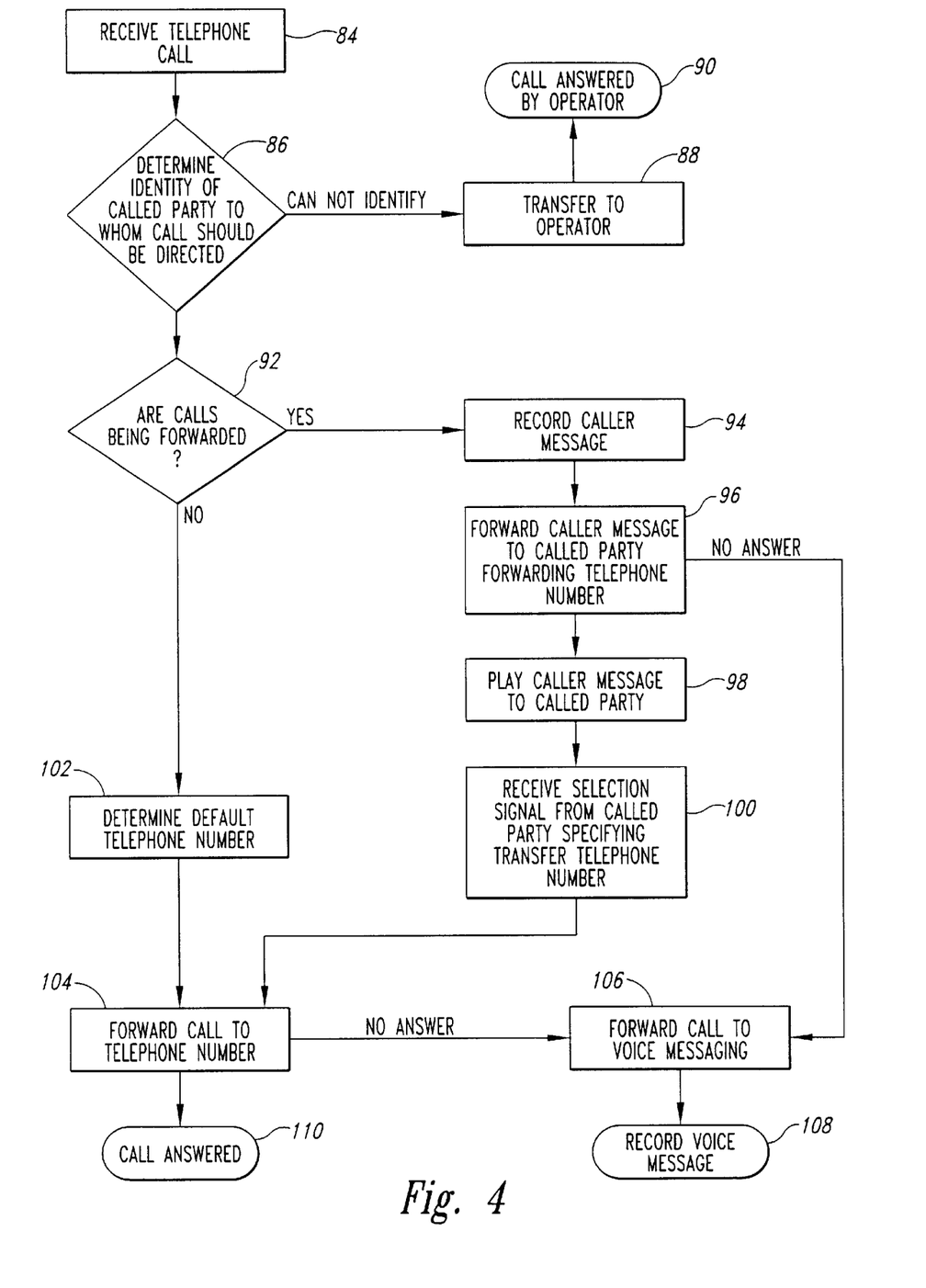
FIG. 4 is a flowchart of the method of the present invention.

In FIG. 4 a telephone call is received 84 and the identity of the called party is determined 86. If the called party can not be identified, the call is transferred to an operator 88 and the call is answered by an operator 90.

If the called party is identified, then the system checks to see if calls are being forwarded 92. If calls are being forwarded, then a voice message from the caller is recorded 94. The caller's message is then forwarded to the called party's forwarding telephone number 96. If the telephone is answered, the caller's message is played for the called party 98. A selection signal is received from the called party 100 and the call is transferred to the telephone number associated with the selection signal 104. In the preferred embodiment, the called party is presented with a list of potential forwarding numbers, including transferring the call to the called party or to a voice messaging system. The list of potential forwarding numbers can be based on one or more preprogrammed criteria including the identity of the called party's current or most recent network logon device, day of the week, date, time of day, the source of origin of the call, and/or the identity of the caller.

If calls are not being forwarded 92, then the default telephone number is determined 102 and the call is forwarded to the default number 104. If there is no answer at the called party forwarding number 96 or the telephone number to which a call has been forwarded 104, then the call is forwarded to a voice messaging system 106 and a message is recorded 108.

Figure 5:
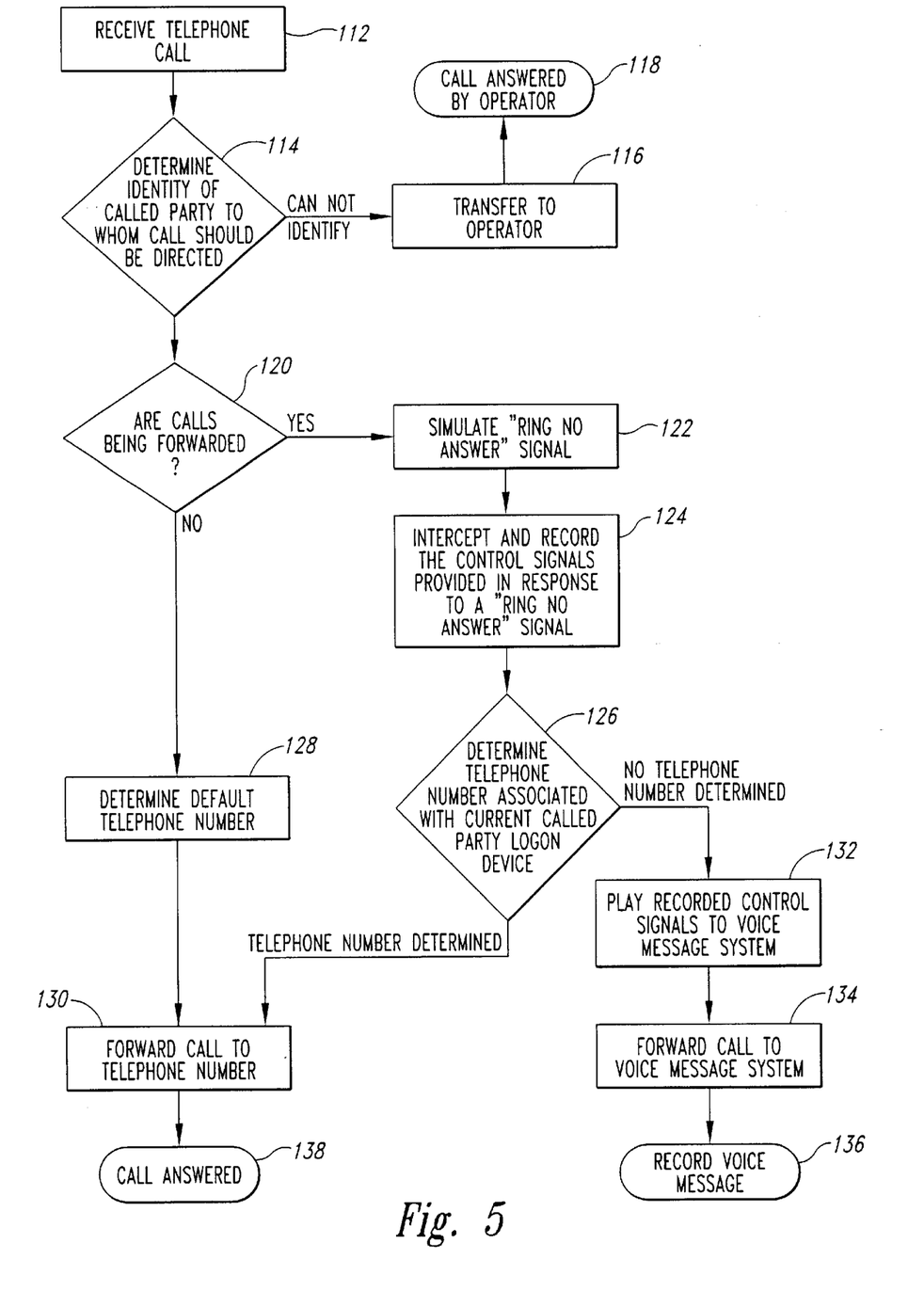
FIG. 5 is a flowchart of the method of the present invention.

In FIG. 5 a telephone call is received 112 and the identity of the called party is determined 114. If the called party can not be identified, the call is transferred to an operator 116 and the call is answered by an operator 118.

If the called party is identified, then the system checks to see if calls are being forwarded 120. If calls are being forwarded, then a "ring no answer" signal is simulated and played back to the telephone network 122. The control signals provided by the telephone network in response to the "ring no answer" signal are intercepted and recorded 124. The signals can be in band DTMF tones, some other in band signalling system, or an out of band signalling system. If out of band tones are used the signalling line must be monitored as well as the communications line. The telephone number associated with the called party's current network logon device is determined 126, and the call is forwarded to that telephone number 130. Alternatively the call could be forwarded to a telephone number based upon some criteria other than the called party's current logon location.

If calls are not being forwarded 120, then the default telephone number is determined 128 and the call is transferred to that number 130. If there is no answer at that number, the prior art voice message system will record a message as usual.

If no forwarding telephone number is determined 126, then the recorded control signals are played to the voice message system 132 and the call is transferred to the voice message system 134. The voice message system responds as if there had been no interruption in the call and records a voice message 136 as if the "ring no answer" control signals had been received directly from the telephone network.

From the foregoing teachings, it can be appreciated by one skilled in the art that a new, novel, and nonobvious telecommunication management system has been disclosed. It is to be understood that numerous alternatives and equivalents will be apparent to those of ordinary skill in the art, given the teachings herein, such that the present invention is not to be limited by the foregoing description but only by the appended claims.

I claim:

1. A method for managing a telecommunications system in which call forwarding is determined by whether a computer terminal is logged into a computer network, comprising the steps of:

a) receiving a call on a telephone system which is coupled to a computer network;

b) determining the identity of a called party to whom said call should be directed;

c) identifying which one of a plurality of network logon devices associated with said called party is logged-on to said computer network;

d) identifying a telephone number associated with said network logon device; and e) forwarding the call to said telephone number;

wherein said called party can specify to continue steps a) through e) for a specified time after said one of the plurality of network logon devices associated with said called party-is logged off said computer network.

2. The method of claim 1 wherein steps a) through e) can be scheduled for a predefined period of time after said one of the plurality of network logon devices associated with said called party is logged-on to said computer network regardless of whether said network logon device is presently logged on to said computer network.

3. The method of claim 1 wherein steps d) and e) vary depending on which one of said plurality of network logon devices associated with said called party is logged-on to said computer network, such that a first call received at step a) including a signal identifying said first call as a voice call is forwarded at step e) to a first telephone number associated with said network logon device and a second call received at step a) including a signal identifying said second call as a facsimile call is forwarded at step e) to a second telephone number associated with said network logon device.

4. The method of claim 1 wherein said call is directed to a voice messaging system at step e) if none of said plurality of network logon devices associated with said called party is identified as logged-on.

5. The method of claim 1 wherein said call may be forwarded at step e) to any one of a plurality of telephone numbers and the identification at step d) of which telephone number said call is forwarded to is based upon the date and time said call is received.

6. A method for managing a telecommunications system in which call forwarding is controlled by a calling party, comprising the steps of:

a) receiving a call from the calling party on a telephone network requesting communications with a called party;

b) presenting said calling party with a menu listing a plurality of locations to which the call can be forwarded;

c) receiving a selection signal from said calling party identifying the location to which said call is to be forwarded; and d) forwarding said call to a forwarding telephone number associated with said selection signal;

wherein said menu listing is modified based upon whether or not said called party is presently logged on to a computer network.

7. The method of claim 6 wherein said menu listing includes a location not associated with said called party.

8. The method of claim 6 wherein said menu listing is modified based upon the identity of said calling party identified through an identification code entered by said calling party via a telephone.

9. The method of claim 6 wherein said menu listing is modified based upon the identity of said calling party identified through an identification code entered by said calling party via a computer connected to a data network.

* * * * *